June 8, 1943.　　B. B. WEATHERBY ET AL　　2,321,341
SEISMIC SURVEYING
Filed May 26, 1933　　2 Sheets-Sheet 1

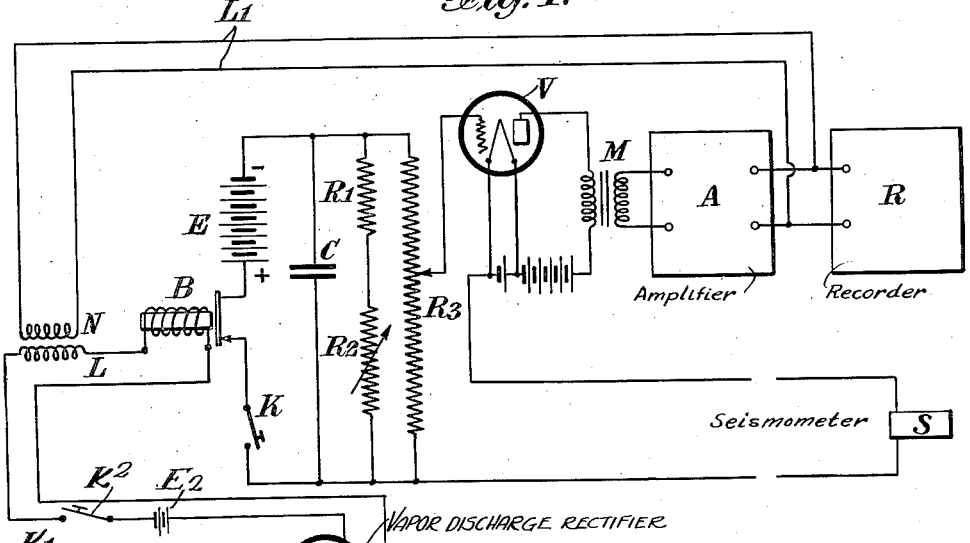
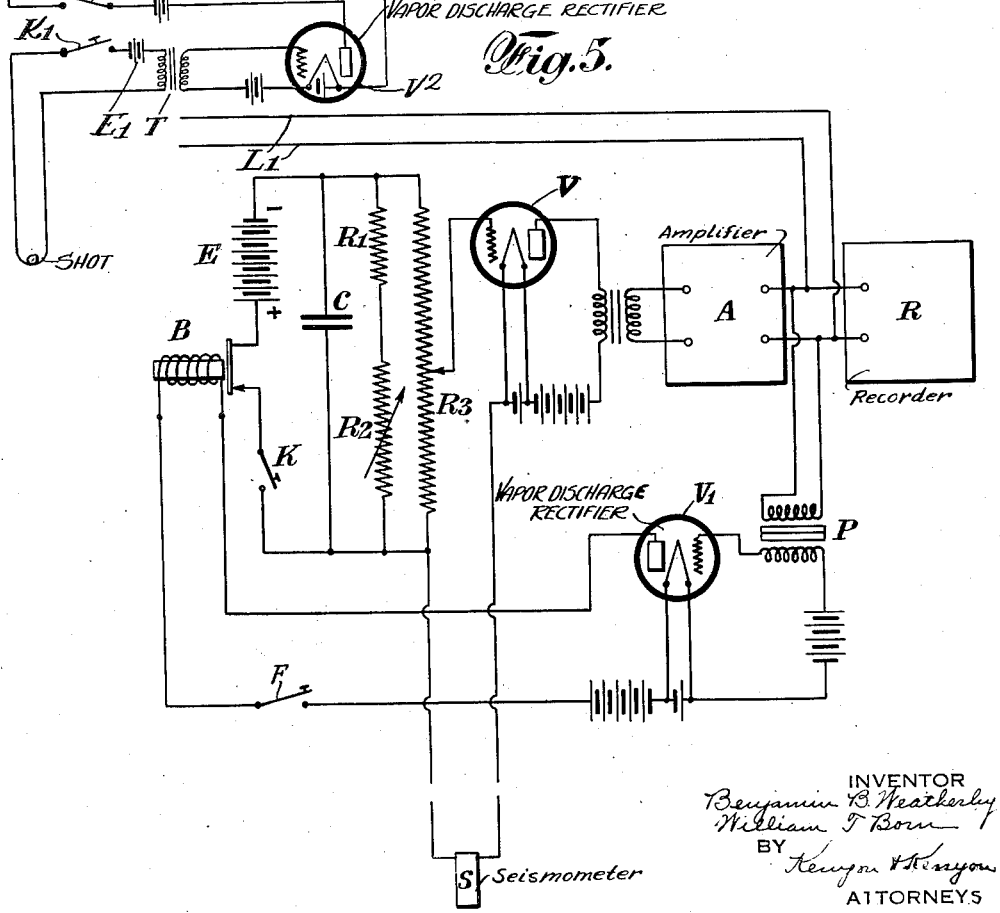

Patented June 8, 1943

2,321,341

UNITED STATES PATENT OFFICE 2,321,341

SEISMIC SURVEYING

Benjamin B. Weatherby, Tulsa, Okla., and William T. Born, Bloomfield, N. J., assignors to Geophysical Research Corporation, New York, N. Y., a corporation of New Jersey Application May 26, 1933, Serial No. 672,996

16 Claims. (Cl. 177—352)

This invention relates to seismic surveying.

In making seismic surveys by the so-called reflection method, a record is made of the earth's disturbance produced at a given point on the earth's surface as the result of the detonation of an explosive charge placed in the earth's surface at a distant point. In general, the record shows waves which have traversed paths close to the earth's surface and waves which have penetrated the earth and have been reflected by interfaces between two layers of different properties or characteristics. In many cases, several interfaces are present at varying depths and the record will show waves reflected from such interfaces. In general, the amplitude of the direct wave or wave traversing a path close to the surface is much greater than the amplitude of the reflected waves and in general, the amplitude of the reflected waves decreases with increase in depth of the interfaces from which they are reflected. Thus, a wave reflected from a shallow interface is received earlier and is of greater amplitude than a wave reflected from a deep interface. If the sensitivity of the recording system and the size of the dynamite charge are so adjusted as to record the reflection from a deep interface with the desired amplitude, then the amplitude of reflected waves from shallower interfaces will be too large for satisfactory recording and the amplitude of the direct wave will be so great that its characteristics are not readily observable from the record produced.

The present practice, therefore, requires that several records be taken to obtain satisfactory observations of the several reflected waves, the explosive charge being adjusted in each case to produce the desired amplitude. This practice entails loss of time, unnecessary effort and is otherwise inconvenient by reason of the multiplicity of records.

An object of this invention is to produce a single record of the direct and reflected waves in which the amplitude of waves reflected from interfaces of different depths is recorded with approximately the same amplitude and the direct waves are recorded with their amplitude reduced to such extent that their characteristics are readily observable.

In general, the amplitudes of the various waves received at the recording position are approximately inversely proportional to the distances they have traveled through the earth. While the velocities of the various waves are not generally the same, they are sufficiently alike so that the amplitudes of the waves received are roughly in inverse proportion to their travel times from the shot point to the recording position. According to the present invention, the amplification of the recording system is automatically increased as a function of time so that the earlier received waves are amplified less than the later received waves. The maximum and the minimum values of amplification, as well as the rate of increase of amplification, may be so adjusted that all the received waves are recorded with amplitudes sufficiently alike to afford satisfactory observations of all the waves.

Other objects, novel features and advantages of this invention will be apparent from the following specification and accompanying drawings, wherein:

Fig. 4 illustrates one form of apparatus for producing the record shown in Fig. 3, and Fig. 5 illustrates a modified form of such apparatus.

Figure 1:
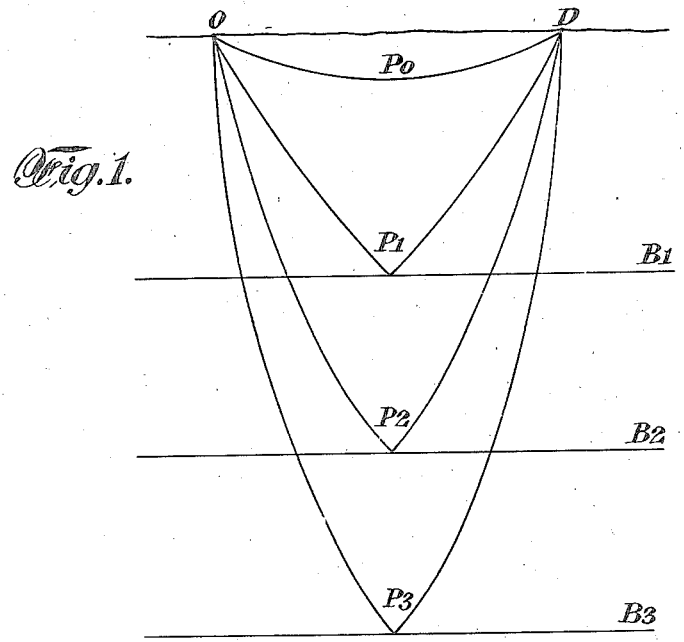
Fig. 1 illustrates the paths followed by seismic waves from their source to the seismograph.

In Fig. 1, O denotes the shot point or point of origin of the seismic waves and D denotes the position of the seismograph. The path of a direct wave is labeled $P_0$, while $P_1$, $P_2$, and $P_3$ denote the paths of waves reflected respectively from the interfaces $B_1$, $B_2$ and $B_3$.

Figure 2:
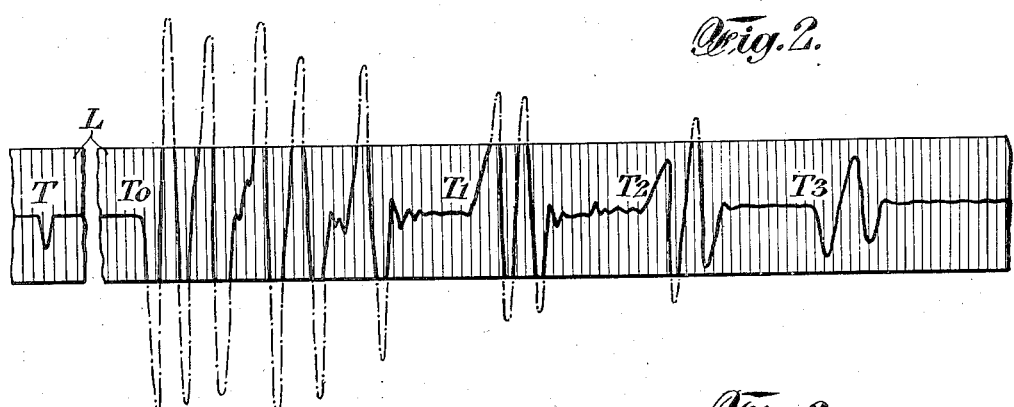
Fig. 2 illustrates a record of such waves made according to the present practice.

In the record shown in Fig. 2, T represents the time of firing the shot which produces the seismic waves. $T_0$ indicates the time of arrival of the direct wave while $T_1$, $T_2$ and $T_3$ indicate respectively times of arrival of the waves reflected from the interfaces $B_1$, $B_2$ and $B_3$. The amplitude of the direct wave is much greater than the amplitude of the first reflected wave and the amplitudes of the subsequent reflected waves become progressively smaller. Assuming that the size of the dynamite charge and the amplication of the recording system is so adjusted as to record the reflection from interface $B_3$ with the desired amplitude, then the amplitude of the reflections from the interfaces $B_2$ and $B_1$ and the amplitude of the direct wave will be excessive for satisfactory observation and in order to get satisfactory observation of the several reflections, it is necessary to make several records with different adjustments of the recording system and/or of the explosive charge used.

Figure 3:
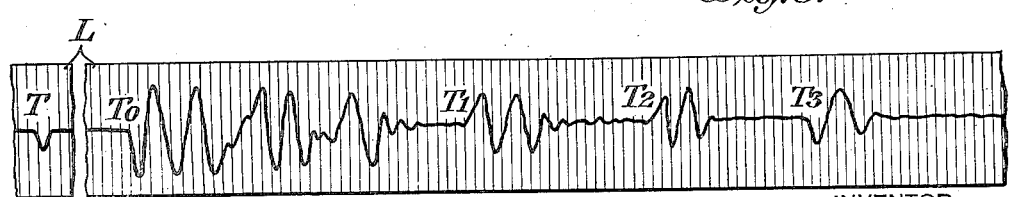
Fig. 3 is a record of such waves made according to this invention.

According to the present invention, the amplifying system of the recorder is so designed that the amplification of the output of the seismometer is progressively increased and, in the record thus produced, the indications of the various waves are of substantially the same amplitude, the stronger waves being amplified to a less degree than the weaker waves, thereby permitting satisfactory observation of the direct wave and several reflected waves on the same record. Such a record is illustrated in Fig. 3, wherein the modified indications of the direct and reflected waves are of approximately the same amplitude.

In Fig. 4, S indicates an electrical seismometer preferably of the Galitzen type which is located in the earth at the receiving station D. A vacuum tube V is provided with the usual output and input circuits and the seismograph S is arranged in the input circuit in series with a voltage divider $R_3$ with which are associated a fixed resistance $R_1$ and a variable resistance $R_2$. The two resistances $R_1$ and $R_2$ which are in series with each other are connected in parallel with the voltage divider $R_3$ and also in parallel with a battery E through the contacts of a relay B and a switch K. A condenser C is also connected in parallel with the voltage divider $R_3$. The winding of the relay B is connected by a line L running to the shot point. The output circuit of the vacuum tube V is inductively connected by the transformer M to the input of an amplifier A having its output connected in turn to a recorder R. Alternatively, the tube V may constitute the first stage of the amplifier unit.

The operation of the above described circuit is as follows: When the switch K and the contacts of the relay B are closed, the battery E will charge the condenser C and also cause current to flow through the voltage divider $R_3$ and the parallel-arranged resistance $R_1$ and $R_2$. The grid potential of the vacuum tube V is thus made negative with respect to the filament, the absolute value of the grid potential being dependent upon the voltage of the battery E and the position of the sliding contact of the voltage divider $R_3$. If then either the switch K or the relay contacts are opened, the condenser will discharge through the resistors in parallel with it, the rate of discharge being determined by the size of the condenser and the magnitude of the resistances. As the condenser discharges, the negative potential on the vacuum tube grid will also decrease, reaching its minimum value when the condenser is completely discharged. As the output of the vacuum tube V is dependent upon the value of the grid potential, it will, therefore, vary as the condenser discharges, being at its minimum when the condenser is fully charged and at its maximum when the condenser is completely discharged. The ratio of the maximum to minimum amplification may be adjusted by means of the voltage divider $R_3$, while the rate of discharge of the condenser may be varied by changing the value of the resistance $R_2$. The resistance $R_1$ serves to prevent short-circuiting the battery E when the resistance $R_2$ is reduced to zero. For convenient operation, the circuit constants preferably are so chosen as to make the time constant of the condenser and its associated resistances variable from .5 to 2.0 seconds and the ratio of maximum to minimum amplification variable from 5 to 25. The primary of a transformer N is connected to one side of the line L and the secondary of such transformer is connected by a line $L_1$ with the input of the recorder R.

After the resistance $R_2$ and the voltage divider $R_3$ have been properly adjusted, the switch K is closed with the relay contacts closed. The amplification of the system is at its minimum value and the apparatus is ready for use. At the shot point means are provided to cause an electrical current to flow through the line L upon explosion of the dynamite charge at the shot point. A loop of wire is wrapped around the charge of explosive and is connected in series with a switch $K_1$, a battery $E_1$ and the primary of a transformer T. The secondary of the transformer T is connected between the control electrode and cathode of a grid-controlled vapor discharge tube rectifier $V_2$ and the output of said rectifier is connected to the line L, this line having in one side thereof the battery $E_2$ and the switch $K_2$. When ready to shoot, the switch $K_1$ is closed and then the switch $K_2$ is closed with the rectifier $V_2$ so adjusted that no current flows in the plate circuit. The charge is then detonated, thus breaking the loop and causing a cessation of current flowing from the battery $E_1$ through the primary of transformer T. This produces a voltage surge in the secondary of the transformer T which surge excites the rectifier $V_2$ and causes current to flow in the line L. The flow of current in the winding of the relay B causes the movable contact to swing away from the fixed contact thereby opening the circuit, while flow of current in the line $L_1$ causes the recorder R to indicate the time T of firing the shot. The condenser C, therefore, discharges, thus automatically causing progressive increase in the amplification of the recording system. The variation in amplification is a function of time measured from the instant the seismic charge is exploded. The output of the seismograph S is thus progressively amplified. The system is so adjusted that the last reflected wave is recorded with the desired amplitude and the preceding waves are recorded with roughly the same amplitude because of the lesser amplication of such waves.

In some cases, it is desirable to have the amplification increase begin at the instant the first direct wave arrives at the recording position rather than to have the amplification increase begin at the time of the shot. In Fig. 5 there is disclosed a system in which such condition is accomplished. The winding of the relay B, instead of being connected to the line L is included in the plate circuit of a grid-controlled vapor discharge tube rectifier $V_1$. The grid circuit of the rectifier $V_1$ is inductively connected through a transformer P to the output of the amplifier A. A normally closed switch F is included in the output circuit of the rectifier $V_1$. The operation of this system is as follows: The circuit of the tube $V_1$ is adjusted so that normally no current flows in its plate circuit. The grid bias is adjusted to a value slightly below that required to cause an arc to strike between the filament and the plate. The flow of current through the line $L_1$ upon detonation of the shot causes the recorder R to indicate the type T of firing shot without, however, in any way affecting the condition of no current flow in the plate circuit of the tube $V_1$. The arrival of the direct wave at the recording position causes an increase in the voltage applied to the grid of the rectifier $V_1$ from the amplifier output, thus causing an arc to strike between the filament and plate and the current flow in the plate circuit of the tube $V_1$ energizes the relay B, thereby actuating the movable contact to open the circuit and permit the condenser C to discharge as previously described, thus effecting progressive amplification of the received waves. The switch F is opened to de-energize the relay B after all the waves have been received and recorded.

It is of course understood that various modifications may be made in the above described invention without in any way departing from the spirit thereof as defined in the appended claims.

We claim:

1. In a seismograph system comprising a seismic detector and an electric recorder in a circuit, amplifying means between the seismic detector and said recorder adapted to amplify all signals from the seismic detector and arranged in said circuit to amplify strong signals from the seismic detector with relatively low amplification and to amplify weak signals from the seismic detector with relatively high amplification.

2. In a seismograph system for receiving an initial seismic wave and subsequent waves comprising a seismic detector and an electrical recorder in a circuit, amplifying means between the seismic detector and said recorder adapted to amplify strong signals from the seismic detector corresponding to waves subsequent to said initial wave with relatively low amplification and to amplify weak signals from the seismic detector with relatively high amplification.

3. An apparatus for recording mechanical waves of generally decreasing amplitude which vary in magnitude substantially as a function of time from waves of relatively large magnitude to waves of relatively small magnitude comprising, means for converting the received waves into electrical waves, means for amplifying and recording said electrical waves, means for varying the recorder response in a way to gradually and continuously increase the response in a definite predetermined relation to time, said second mentioned relation to time being such that the records of the waves of smaller magnitude are of sufficient magnitude on said strip to permit their form to be studied without the record of the waves of larger magnitude extending beyond the said limited width of strip.

4. In a seismograph system comprising a seismograph detector and an electrical recorder in circuit, amplifying means between the seismic detector and said recorder adapted to amplify signals from the seismic detector and arranged in said circuit to amplify said signals with progressively varying amplification to effect relatively low amplification of strong signals and progressively higher amplification of weak signals.

5. In seismic prospecting apparatus for receiving seismic waves, the amplitudes of which decrease as a function of time, means for converting said waves into electrical pulsations of corresponding magnitude and conducting said pulsations to a recorder responsive to the amplitudes of the pulsations, means associated with said recorder for initially reducing its responsiveness to said pulsations below its normal response and then increasing its response to said pulsations at a rate which is in substantially inverse proportion to the rate of decrease of the amplitudes of said waves, whereby the amplitude of the recorded waves is maintained substantially constant.

6. A device for recording seismic vibrations that comprises a detector for converting seismic vibrations to electrical vibrations, an amplifier for amplifying said electrical vibrations, means for recording said vibrations, means for controlling the magnitude of the amplified electrical vibrations without distortion of the base line of the vibrations, and means for bringing into operation said control means at the time necessary to control the magnitude of said vibrations.

7. A device for recording seismic vibrations that comprises a detector for converting seismic vibrations to electrical vibrations, an amplifier for amplifying the electrical vibrations from said detector, means for recording the amplified electrical vibrations, and regulating means for controlling the amplification of the vibrations from said detector so that in general the vibrations of less magnitude will be more strongly amplified than those of larger magnitude.

8. A system for recording artificial seismic waves of varying amplitude on a record strip of limited uniform width comprising a vacuum tube amplifier having a cathode and a control electrode, an electrical seismometer, means for impressing the output voltage of said seismometer between said cathode and control electrode, means for applying progressively decreasing negative voltage to said control electrode during substantially the entire period of reception of the seismic waves, a recorder, and connections for impressing the output of said amplifier upon said recorder.

9. A system for recording artificial seismic waves of varying amplitude on a record strip of limited uniform width comprising a vacuum tube amplifier having a cathode and a control electrode, an electrical seismometer, means for impressing the output voltage of said seismometer between said cathode and control electrode, means for applying negative voltage to said control electrode, means effective at the instant of seismic wave generation for progressively decreasing the negative voltage applied to said control electrode during substantially the entire period of reception of the seismic waves, a recorder, and connections for impressing the output of said amplifier upon said recorder.

10. An apparatus for recording, on a limited width of recorder strip, artificially produced seismic waves which include waves received from underlying strata of the earth, said waves comprising a series of waves diminishing in strength substantially as a function of time, comprising a seismic detector for converting the seismic waves into oscillating electrical energy, amplifying means for amplifying said electrical energy, means adapted to record said amplified electrical energy on said recorder strip, and means for controlling the sensitivity of the amplifying means in such a way that it amplifies electrical energy created by said waves with a sensitivity increasing as the strength of said waves diminishes.

11. A device for recording seismic vibrations that comprises a detector for converting seismic vibrations to electrical vibrations, a thermionic amplifier for amplifying the electrical vibrations from said detector, means for recording the amplified electrical vibrations, and regulating means for controlling the amplification of the vibrations from said detector so that in general the vibrations of less magnitude will be more strongly amplified than those of larger magnitude, said control means being operative to apply an electrical bias to the grid of at least one thermionic tube in the amplifier for said detector and there being separate means provided independently to adjust the bias of said grid.

12. A system for recording artificial seismic waves of varying amplitude on a record strip of limited uniform width which comprises an electrical seismometer, a vacuum tube amplifier having a cathode and control electrode, a recorder, connections for impressing the output of said vacuum tube amplifier upon said recorder, and means for impressing the output voltage of said seismometer between said cathode and control electrode, said means consisting of a voltage divider having an adjustable contact, connections from said cathode to one seismometer terminal and from the other seismometer terminal to one terminal of the voltage divider and from said adjustable contact to said control electrode, a battery and a normally closed switch connected in series with said voltage divider to form a complete circuit, a resistance and a capacity, each connected in shunt to said voltage divider, the battery being so connected as to normally bias the control electrode negatively and the magnitudes of the battery voltage, resistance and capacity being such that with a proper setting of the adjustable contact the stronger waves will be recorded within the limited width of the record strip and the weaker waves will be recorded with sufficient magnitude to enable their form to be studied, and means to open said switch at such time that the negative potential on said control electrode gradually decreases throughout substantially the entire time of reception of said seismic waves.

13. A system for recording artificial seismic waves of varying amplitude on a record strip of limited uniform width comprising a vacuum tube amplifier having a cathode and a control electrode, an electrical seismometer, means for impressing the output voltage of said seismometer between said cathode and control electrode, and means for applying progressively decreasing negative voltage to said control electrode, said means consisting of a condenser, a battery in circuit with said condenser, a switch for opening said circuit, a resistance, means connecting said resistance across said condenser for discharging the same upon opening of said switch, connections for applying the voltage drop across said resistance between said control electrode and said cathode, the battery being so connected as normally to bias the control electrode negatively and the magnitudes of the battery voltage, resistance and capacity being such that the stronger waves will be recorded within the limited width of the record strip and the weaker waves will be recorded with sufficient magnitude to enable their form to be studied, means for opening said switch at such time that the negative potential on said control electrode gradually decreases throughout substantially the entire time of reception of said seismic waves, a recorder, and connections for impressing the output of said amplifier upon said recorder.

14. In seismic prospecting in which the amplitudes of the waves received at the point of observation decrease as a function of time, the step of increasing the sensitivity of the recording system as a function of time whereby the amplitudes of the recorded waves are maintained substantially constant.

15. A process of seismic prospecting that comprises generating seismic waves, detecting said seismic waves after they have travelled through the earth and converting them into electrical vibrations, amplifying the electrical vibrations, recording the amplified vibrations and gradually varying the amplification of said electrical vibrations during the reception of the seismic waves so as to keep the amplified waves of the same general order of magnitude.

16. A process of seismic prospecting that comprises generating seismic waves, detecting said seismic waves after they have travelled through the earth and converting them into electrical vibrations, amplifying the electrical vibrations, recording said amplified vibrations, and changing the degree of amplification during the reception of said seismic waves, without affecting the base line thereof so as to control the magnitude of the amplified waves and permit them to thereafter be recorded along a substantially straight base line and on a record strip of limited width.

BENJAMIN B. WEATHERBY.
WILLIAM T. BORN.